Figure 1:
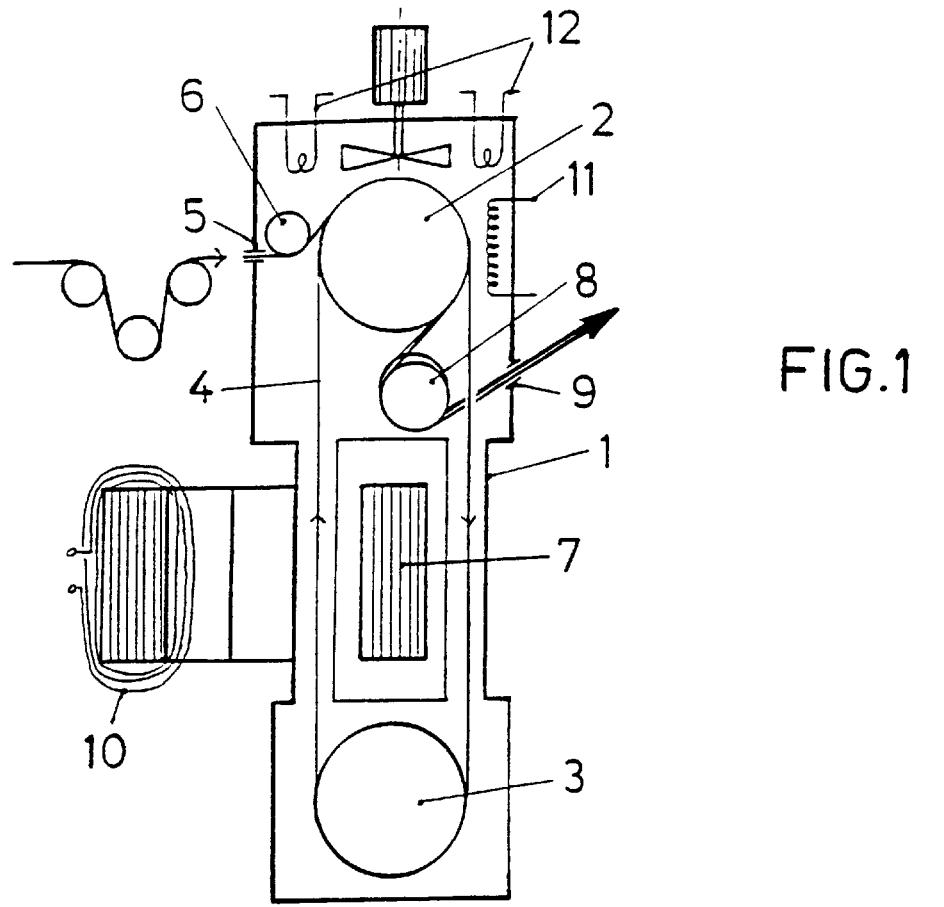

United States Patent [19]
Ebner et al.

[11] Patent Number: 6,056,913
[45] Date of Patent: May 2, 2000

[54] PLANT FOR THE CONTINUOUS HEAT TREATMENT OF STEEL STRIPS OR THE LIKE

[76] Inventors: Peter Ebner, Bergham 168; Heribert Lochner, Burgwallstreasse 19, both of A-4060 Leonding, Austria

[21] Appl. No.: 09/157,221
[22] Filed: Sep. 18, 1998

[30] Foreign Application Priority Data

Sep. 22, 1997 [AT] Austria ................................ A 1597/97

[51] Int. Cl.⁷ .................................................. C21D 9/62
[52] U.S. Cl. .......................................... 266/104; 266/109
[58] Field of Search .................................. 266/103, 104, 266/109, 249

[56] References Cited

U.S. PATENT DOCUMENTS 4,117,295  9/1978  Beach ........................................ 266/104
4,529,175  7/1985  Kyriakis .................................... 266/104

*Primary Examiner*—Scott Kastler
*Attorney, Agent, or Firm*—Collard & Roe, P.C.

[57] ABSTRACT

A plant for the continuous heat treatment of steel strips (4) or the like has a nonmagnetic insulated housing (1), in which two axially parallel unheated rollers (2, 3) are disposed at a distance from each other. To the first roller (2), the steel strip (4) or the like is supplied, which is then wound around the second roller (3) and as a secondary winding gets back to the first roller (2) through a transformer plate assembly (7) and is discharged from said second roller. The primary winding (10) with a corresponding number of turns is disposed outside the housing (1). The housing (1) is filled with a protective gas and has means (11, 12) to ensure a uniform temperature level and distribution in the housing (1).

4 Claims, 1 Drawing Sheet

PLANT FOR THE CONTINUOUS HEAT TREATMENT OF STEEL STRIPS OR THE LIKE

This invention relates to a plant for the continuous heat treatment of steel strips or the like.

Semi-finished metal products, in particular steel strip or the like, must first be subjected to a heat treatment, in order to obtain a structure required for the future application. One of these heat treatments is quenching and tempering. In this treatment, the steel strip is brought to a temperature level above AC 3, depending on the composition of the carbon content and the remaining alloying constituents, is subsequently quickly cooled down, i.e. quenched, and tempered at a lower temperature level.

It is known to perform the heating of the steel strip or the like in induction plants or in furnaces with or without annealing muffles, and to perform the subsequent quenching in liquid-metal or oil baths or in a protective gas stream. It is also known to effect the heating in fluidized-bed installations or in liquid-metal baths, where the bath is designed as power supply contact and the strip to be annealed is used as resistance heating.

All these plants or devices have various deficiencies. Since adhering residues of oil or liquid metal are discharged from the bath via the strip surface, a corresponding burden to the environment is effected. When the heating is effected by radiation, long, complicated and expensive furnaces are required. In the case of gas quenching baths, the required quenching speed is not achieved in many cases, which in addition involves a high consumption of energy.

It is the object of the invention to eliminate these deficiencies and create a plant for the continuous heat treatment of steel strips or the like, which requires relatively little constructional effort, leads to a saving of energy by a simple transfer of energy, requires no quenching media harmful to the environment, and provides for a good controllability of the temperature.

This object is solved by the invention in that in an insulated nonmagnetic housing two axially parallel unheated rollers are provided at a distance from each other, around which there is wound the steel strip supplied to the first roller and withdrawn from the same upon treatment, where between the two rollers a transformer plate assembly is provided, which comprises a secondary winding formed by the steel strip and a primary winding provided outside the housing and maintained at the corresponding turns ratio depending on the desired electrical power, where the steel strip heated in the transformer is then quenched by the supplied cold steel strip as well as by the first roller.

Thus, a simple transfer of energy is effected by the transformer, and quenching results in a saving of energy, as upon cooling the steel strip or the like on the first roller, which may be referred to as quenching roller, the supplied steel strip or the like serves as quenching agent and is pre-heated at the same time, where the design of the plant does not require a major constructional effort.

In the vicinity of the first roller, i.e. the quenching roller, auxiliary means should favorably be provided for adjusting a uniform temperature level and distribution. These auxiliary means may include an electric heating means, cooling means as well as a circulation means.

To avoid an undesired oxidation of the steel strip or the like during the heat treatment, the housing is filled with a protective gas which may consist of nitrogen, hydrogen or a mixture thereof. It is, however, also possible to use other non-oxidizing gases or gas mixtures.

The exchange of energy may also be effected by means of quenching plates disposed before the first roller. The plant may of course be designed for a plurality of steel strips or the like one beside the other or also for wire, in which case the wire supplied does not constitute a quenching agent, but merely the first roller is used for quenching purposes.

Figure 2:
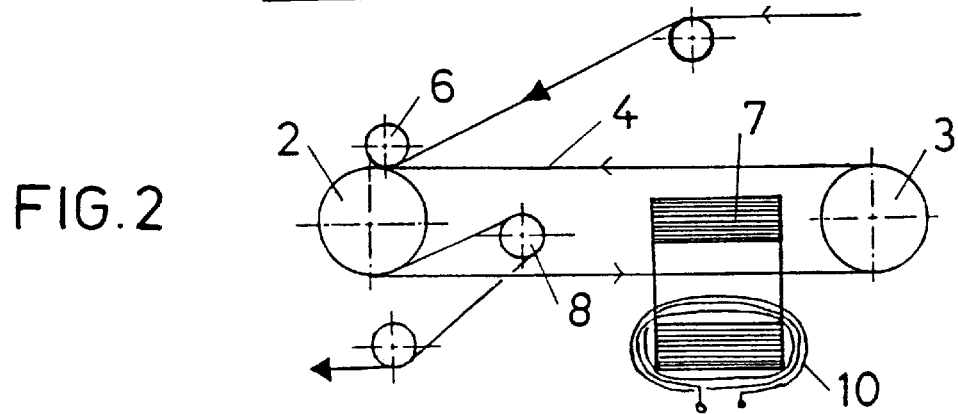
Figure 3:
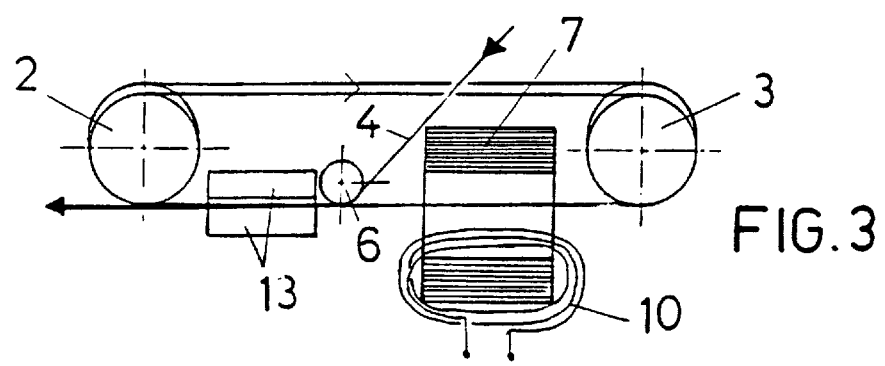

In the drawing, the subject-matter of the invention is represented by way of example, wherein:

FIG. 1 represents a schematic plan view of a plant for the heat treatment of steel strips, and FIGS. 2 and 3 represent constructive modifications.

In an insulated nonmagnetic housing 1 two axially parallel rollers 2, 3 are disposed at a distance from each other. The steel strip 4 to be treated is supplied to the first roller 2 via an inlet opening 5 and a deflection roller 6, passes to the second roller 3 and then through a transformer plate assembly 7 back to the roller 2, where it preheats the incoming strip and is quenched by the same as well as by the roller 2 upon being heated in the plate assembly. Via a deflection roller 8 used for crossing the strip during its passage, the steel strip 4 passes to the outlet 9.

In the transformer plate assembly 7 the steel strip 4 forms the secondary winding, whereas the primary winding 10 is disposed outside the housing 1 and has a number of turns adapted to the desired heating of the strip by power transfer. In the housing 1 a uniform temperature level and a uniform temperature distribution are ensured by the electric heating 11 and cooling means 12. The housing 1 is filled with a protective gas.

FIG. 2 is a schematic representation of a slightly modified version of the plant, whereas in the horizontally arranged plant in accordance with FIG. 3 a plurality of strips 4 or the like are treated at the same time and quenching plates 13 are disposed before the discharge roller 2. In the case of a multi-wire operation a symmetrical loading of the electric network can be effected, just as a good controllability of the temperature can be achieved by controlling the supply of energy on the primary side of the transformer, e.g. Triac.

We claim:

1. A plant for the continuous heat treatment of elongated steel elements, which comprises (a) an insulated non-magnetic housing defining an inlet for the elongated steel elements to be heat treated and an outlet for the heat treated steel elements, (b) two unheated rollers arranged in the housing at a distance from each other, the rollers having axes parallel to each other, a first one of the rollers being arranged to receive the elongated steel elements from the inlet, and a second one of the rollers being arranged to receive the elongated steel elements from the first roller, the elongated steel elements being wound around the rollers to be returned from the second roller to the first roller whence they are withdrawn from the housing through the outlet after passing over the first roller, and (c) a transformer plate assembly comprising (1) a secondary winding formed by the elongated steel elements as they pass from the second roller back to the first roller, and (2) a primary winding arranged outside the housing and maintained at a winding ratio dependent on the desired electrical power, whereby the elongated steel elements are heated in the transformer plate assembly and are then quenched by the elongated steel elements received by the first unheated roller through the inlet and by the first unheated roller itself.

2. The plant of claim 1, further comprising auxiliary means arranged in the housing adjacent the first roller for adjusting a uniform temperature level and distribution in the housing.

3. The plant of claim 1, further comprising a protective gas filling the housing.

4. The plant of claim 1, further comprising quenching plates arranged in the housing between the transformer plate assembly and the first roller.

\* \* \* \* \*